"(12) United States Patent
Stevens et al.

(10) Patent No.: US 6,778,716 B1
(45) Date of Patent: Aug. 17, 2004

(54) METHOD AND APPARATUS FOR MEMS OPTICAL SENSING USING MICROMIRRORS

(75) Inventors: Rick C. Stevens, Apple Valley, MN (US); Kevin J. Thorson, Eagan, MN (US)

(73) Assignee: Lockeed Martin Corporation, Bethesda, MD (US)

( * ) Notice: Subject to any disclaimer, the term of this patent is extended or adjusted under 35 U.S.C. 154(b) by 0 days.

(21) Appl. No.: 10/368,794

(22) Filed: Feb. 19, 2003

(51) Int. Cl.[7] .................................................. G02B 6/00
(52) U.S. Cl. ............................. 385/12; 385/15; 385/18; 250/227.11; 250/227.15
(58) Field of Search ............................. 385/12, 15–23; 250/227.11–227.32

(56) References Cited

U.S. PATENT DOCUMENTS 6,526,194 B1 * 2/2003 Laor ............................. 385/18
6,618,184 B2 * 9/2003 Jin et al. ..................... 359/291
6,632,373 B1 * 10/2003 Rosa et al. ................... 216/24

* cited by examiner

*Primary Examiner*—Diane I. Lee
*Assistant Examiner*—Seung H Lee

(57) ABSTRACT

An optical sensing device uses a set of source mirrors directing light from a set of light sources to a movable collector mirror. Each of the light sources has a unique wavelength. The collector mirror is coupled to a MEMS actuator that moves the collector mirror in response to a physical phenomena. A light collector gathers light from the collector mirror and the physical phenomena can be measured by determining the relative intensity associated with each of the light sources in the light gathered at the collector.

44 Claims, 5 Drawing Sheets

"

US 6,778,716 B1

METHOD AND APPARATUS FOR MEMS OPTICAL SENSING USING MICROMIRRORS

FIELD OF THE INVENTION

The present invention relates in general to fiber optic devices, and in particular fiber optic sensing devices.

BACKGROUND

Sensing devices are used in a wide range of technologies. Most automated mechanical and electrical apparatus include some sort of sensing capability. Particularly prevalent are sensors that can be read electronically. In many applications, such sensors provide electrical inputs used as feedback for control circuitry.

Electronic sensors are used to measure all manner of physical phenomena such as temperature, pressure, acceleration, voltage, electromagnetic fields, etc. The variety and adaptability of electronic sensors have resulted in such sensors being utilized in a wide assortment of products.

Some sensing applications pose more difficult challenges than others. For example in aeronautic and space applications, sensors are subjected to extremes of temperature, mechanical and electrical shock, electromagnetic interference, radiation, pressure, acceleration, etc. Also, the volatile fuels used in jet aircraft and rockets require that any sensors used in fuel areas must be carefully designed to prevent electrostatic discharge.

Sensors that are immune from risk of electrostatic discharge are very desirable in many fields, including aerospace and scientific fields. Although sensors for explosive or extreme environments have been developed, the design, manufacture, and testing of such sensors results in the devices being very expensive.

An apparatus and method that address the aforementioned problems, as well as other related problems, are therefore desirable.

SUMMARY

To overcome limitations in the prior art described above, and to overcome other limitations that will become apparent upon reading and understanding the present specification, the present invention discloses a method and apparatus for passive sensing.

In accordance with one embodiment of the invention, a sensing device gathers light from one or more light sources, each light source having a unique primary wavelength. The sensor includes one or more mirrors to reflect light from the light sources. A collector mirror is arranged to reflect light from the mirrors. A light collector is arranged to gather light reflected from the collector mirror. A MEMS actuation member is coupled to the collector mirror. The MEMS actuation member is arranged to rotate the collector mirror in response to a change in a physical phenomena. Rotation of the collector mirror causes a change in the relative intensity of the primary wavelengths of the light sources at the light collector.

In another embodiment of the present invention, a sensing device arranged to gather light from a light source includes a source mirror arranged to reflect light from the light source. One or more collector mirrors are arranged to reflect light from the source mirror. One or more light collectors are arranged to gather light reflected from the respective collector mirrors. A MEMS actuation member is coupled to the source mirror. The MEMS actuation member is arranged to move the source mirror in response to a change in a physical phenomena. Movement of the source mirror causes a change in the relative intensities of light measured at the light collectors.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

DETAILED DESCRIPTION

In the following description of various example embodiments, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention provides a method and apparatus for sensing a physical phenomena by directing light from a plurality of light sources to a movable mirror that is attached a passive Micro-Electro-Mechanical Systems (MEMS) actuator. The MEMS actuator moves the mirror in response to the physical phenomena, thereby affecting the relative intensities of the plurality of light sources as reflected from the movable mirror.

The actuator is formed using the MEMS manufacturing processes. The mirrors, whether fixed or movable, can also be formed as MEMS devices. MEMS devices are micronscale mechanical apparatus formed by processing silicon in a manner similar to the layering used to form semiconductor devices such as microprocessors. In the MEMS process, a mask is deposited and then silicon material etched away in a process known as micromachining.

Because this MEMS design can, but is not limited to, a purely passive mode of operation (e.g. not requiring any electrical power for operation), the devices have inherently high resistance to electric and magnetic fields (EMF). Further, since no electrical power is needed at the sensor for operation, such devices can easily be made safe for use in explosive environments.

Figure 1:
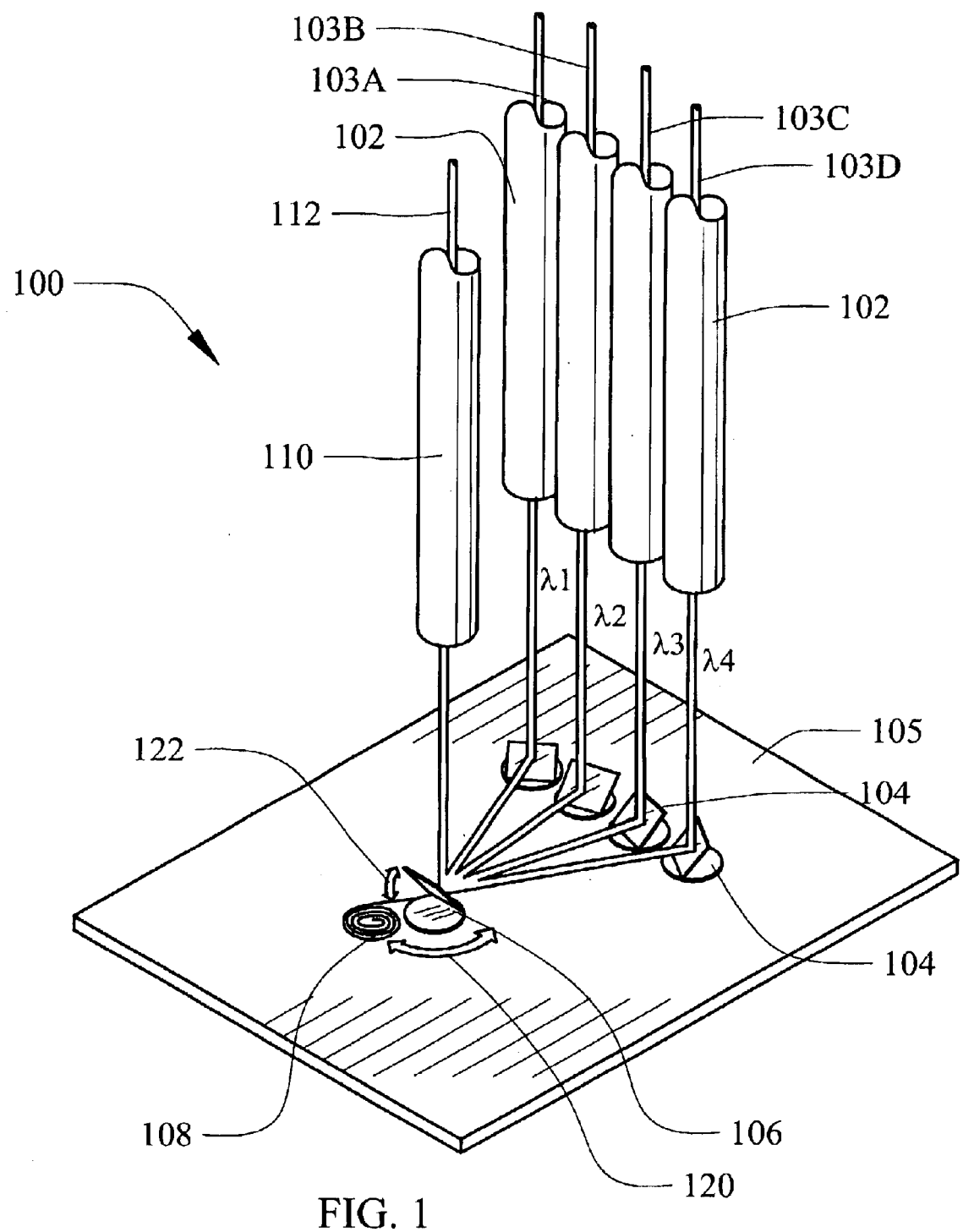
FIG. 1 is a perspective view of an optical sensor according to an embodiment of the present invention.

FIG. 1 is a perspective view of a sensor 100 according to one embodiment of the present invention. A series of light sources 102 (fibers, waveguides, lasers, etc) are arranged to direct light onto a plurality of source mirrors 104. In this example, four sources 102 are used to direct four beams of light 103A, 103B, 103C and 103D to four source mirrors 104. It is appreciated that any number of light sources 102 and mirrors 104 can be used.

As shown in FIG. 1, the source mirrors 104 are typically made fixable so that in operation the mirrors 104 maintain a unchanging orientation relative to the light sources 102. When formed as MEMS devices, the mirrors 104 are formed by micromachining on the plane of the MEMS substrate 105. After micromachining is complete, the mirrors 104 are "flipped" up (i.e. moved from a planar orientation to operational positions as seen in FIG. 1) in a post-fabrication process. This process may involve activating some form of MEMS device attached to the mirrors 104. Such a MEMS device can flip the mirrors 104 up in response to an input such as an electrical field or a temperature change.

Although the source mirrors 104 are generally considered fixed in position during sensor operation, the mirrors 104 may also be made rotatable or otherwise movable. For example, it may be desired to provide a MEMS motor (not shown) coupled to each of the mirrors 104 for calibration purposes. At the testing and calibration phase, these MEMS motors can be used to make minor adjustments to the mirrors 104 to ensure optimum orientation. After adjustment, the mirrors 104 can be fixed in place by disconnecting the motor or by actuating some mechanical feature to hold the mirrors 104 in place.

In another configuration, the source mirrors 104 may be movable over a relatively small range and coupled to some sort of temperature compensation device such as a coiled spring (not shown). In this configuration, the source mirrors 104 would remain fixed in position while the ambient temperature remains constant. Small movements of the temperature compensation device induced by ambient temperature changes would be applied to the mirrors 104, thereby maintaining a constant orientation of the mirrors 104 relative to other components of the sensor 100.

In an operational configuration, the mirrors 104 are arranged to direct the light beams 103A, 103B, 103C, 103D to a collector mirror 106. The collector mirror 106 is movable so that an angle between the collector mirror 106 and each of the source mirrors 104 is varied in response to a physical phenomena. In the illustrated example, the collector mirror 106 is rotatable as indicated by the horizontal curved arrow 120. A MEMS actuator 108 moves the collector mirror 106 in response to a physical phenomena (temperature, pressure, acceleration, etc). Although the illustrated example shows the collector mirror 106 rotating about an axis generally normal to the plane of the MEMS substrate, it is appreciated that any combination of linear and rotational translation can be used to vary the angles between the collector mirror 106 and the source mirrors 104.

The MEMS actuator 108 in FIG. 1 includes a spiral spring. When subjected to temperature changes, such a spring will linearly expand and contract causing a rotation of an outer edge of the spring. The rotating outer edge of the spring causes movement of the collector mirror 106. Other forms of actuators 108 can be formed for nearly any sensing application. Alternate MEMS actuator 108 devices include a piston or membrane for sensing pressure, a brush motor for sensing electromagnetic fields, and a spring and mass for sensing acceleration (shock or vibration). Other devices may be used to measure physical properties such as pH, viscosity, strain, proximity, radiation, humidity, etc.

The collector mirror 106 may be configured to flip up or down as indicated by the vertical curved arrow 122. As previously described with respect to the source mirrors 104, flipping of the collector mirror 106 may occur at least once after micromachining to place the collector mirror 106 in a non-planar orientation with respect to the MEMS substrate 105. A selectable flip up/down feature may be used to activate/deactivate the passive sensor 100 by placing/removing the collector mirror 106 into/from the light path. Mechanical devices to selectably flip the mirrors 104, 106 are well known in the art. For example, a push rod connected to a linear MEMS motor could be used to flip the mirrors 104, 106 up or down.

In operation, the collector mirror 106 receives the beams of light 103A, 103B, 103C, 103D reflected from the mirrors 104. Each beam of light 103A, 103B, 103C, 103D has a unique primary wavelength, $\lambda_1$, $\lambda_2$, $\lambda_3$, and $\lambda_4$, respectively. A device according to the present invention can use any suitable optical wavelengths. For example, designing the sensor 100 for wavelengths conforming to International Telecommunications Union (ITU) telecon grid wavelengths allows the use of industry standard optical components.

The beams of light 103A, 103B, 103C, 103D combine at the collector mirror 106 to form a composite beam of light 112. The composite beam 112 is directed by the collector mirror 106 to a light collector 110. The composite beam 112 at the light collector 110 is examined to measure the physical property of interest in a device according to the present invention.

Rotation of the collector mirror 106 by the actuator 108 affects the relative angle between the mirrors 104 and the collector mirror 106, thereby increasing or decreasing the intensity of the beams 103A, 103B, 103C, 103D as reflected to the light collector 110. The rotation of the collector mirror 106 can therefore be measured as a change in relative intensity of wavelengths $\lambda_1$, $\lambda_2$, $\lambda_3$, $\lambda_4$ within the composite beam 112.

Figure 2:
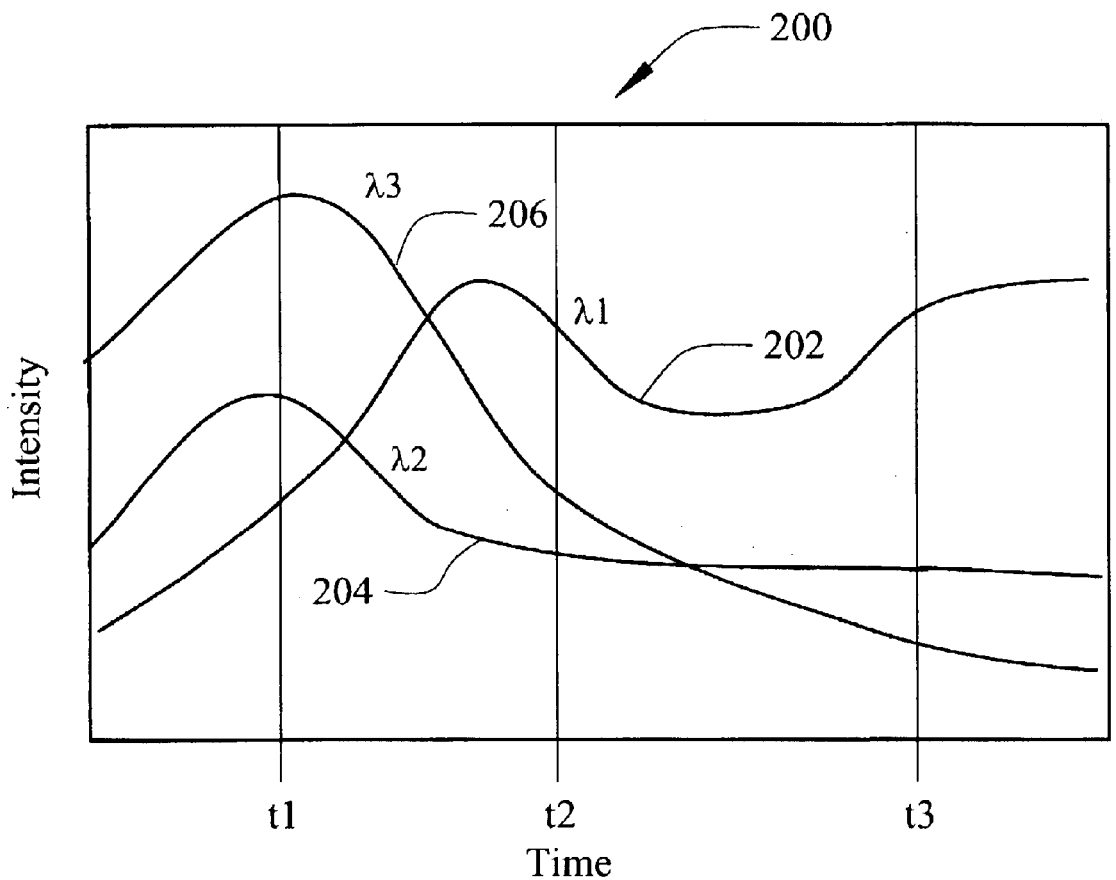
FIG. 2 is a graph illustrating time dependent intensities of light signals seen at the output of a sensor according to an embodiment of the present invention.

FIG. 2 shows a graph of light intensities 202, 204, 206 versus time. The intensities 202, 204, and 206 are components of a composite beam 112 which, in this example, combines three beams of light having wavelengths $\lambda_1$, $\lambda_2$, and $\lambda_3$, respectively. A time-varying physical phenomena causes the actuator 108 to rotate the collector mirror 106 to different positions at times $t_1$, $t_2$, and $t_3$. The effect of collector mirror rotation is the variation of intensities at wavelengths $\lambda_1$, $\lambda_2$, and $\lambda_3$ in the composite beam 112.

Another operational variation of this design (referred to herein as "reverse operation" ) involves transmitting a light beam 112 into the light collector 110, now acting as a light source. The variation in intensities of beams 103A–103D can be used to determine the effect of collector (now source) mirror 106 rotation. The physical phenomena is thereby measured as relative intensity variations between light sources 102 (now collectors) having the same wavelength, that of the beam 112.

Figure 3A:
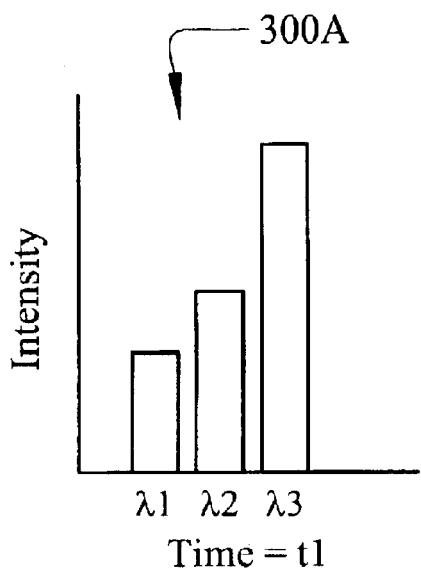
FIG. 3A is a bar graph showing relative intensities of light seen at time $t_1$ of FIG. 2.
Figure 3B:
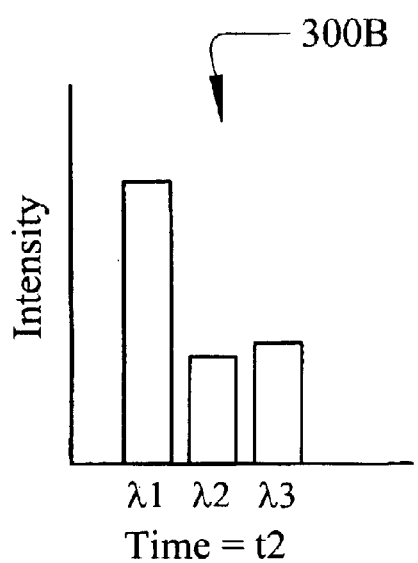
FIG. 3B is a bar graph showing relative intensities of light seen at time $t_2$ of FIG. 2.

FIGS. 3A and 3B show bar graphs 300A and 300B of relative intensities at wavelengths $\lambda_1$, $\lambda_2$, and $\lambda_3$ in the composite beam 112 at times $t_1$ and $t_2$, respectively. Graphs 300A and 300B can be used to derive a value of the phenomena of interest at discrete times $t_1$ and $t_2$. It should be noted that the absolute values of intensity in graphs 300A and 300B are not important in measuring the phenomena, only the relative intensities. This allows a sensor according to the present invention to maintain accuracy despite variations in the absolute level of the composite beam 112. However, care must be taken to ensure that the relative intensities of the light sources 102 are sufficiently invariant over time.

In reverse operation, the intensity values of the bar graphs shown in FIGS. 3A and 3B denoted as $\lambda_1$, $\lambda_2$, and $\lambda_3$ would actually all be of the same wavelength, but would be measured at three different light collectors (e.g. sources 102). Similarly, the intensities plotted in the graph of FIG. 2 would be of light having the same wavelength but measured at different collectors.

Figure 4:
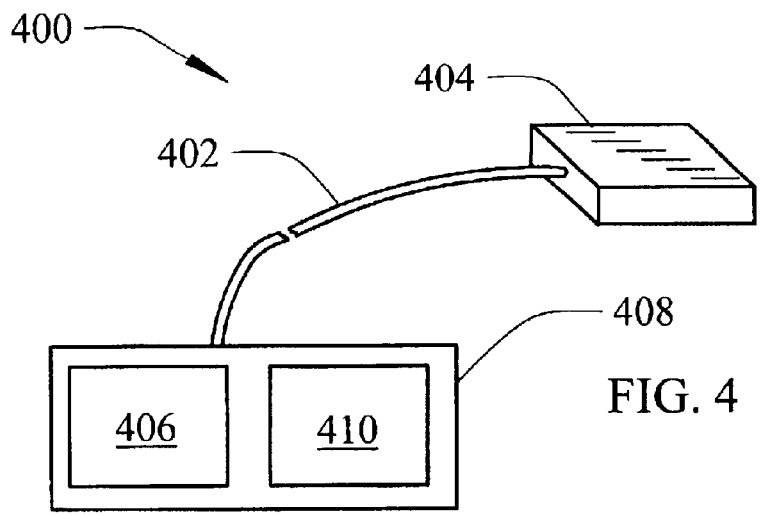
FIG. 4 is a perspective view of a sensor package assembly according to an embodiment of the present invention.

FIG. 4 shows an example of how a MEMS sensor assembly 400 can be packaged for use. A fiber optic cable 402 carries fibers that can act as part of both light sources 102 and light collector(s) 110 for sending and receiving light to/from a sensor package 404. The sensor package 404 is typically a sealed unit containing the MEMS devices of the sensor assembly 400.

One or more lasers 406 can provide a source of coherent light to the fiber cable 402. Other optical devices such as prisms can be used to split a single light source into beams of differing wavelength. As shown in FIG. 4, the lasers 406 can be included as part of an external electronics module 408. The module 408 can also contain prisms, couplers, and other optic devices used with the laser(s) 406, or these devices may be included at or near the sensor package 404.

By placing active optical devices such as lasers 406 in a remotely located module 408 and coupling the devices to the fiber cable 402, the sensor package 404 can be made purely passive. A passive sensor package 404 having no electrical components at the sensing end can be used in explosive or high EMF environments. Alternatively, lasers 406 can be contained within the sensor package 404. Such a placement of lasers 406 would make the package 404 an active device, and the cable 402 in such an arrangement would contain electrical wires.

An optical sensor 410 can read the composite light from a light collector 110 coupled to the fiber cable 402. The optical sensor 410 can be included in the electronics module 408 in the passive configuration shown, or can be housed within the package 404 in an active sensor configuration.

Figure 5:
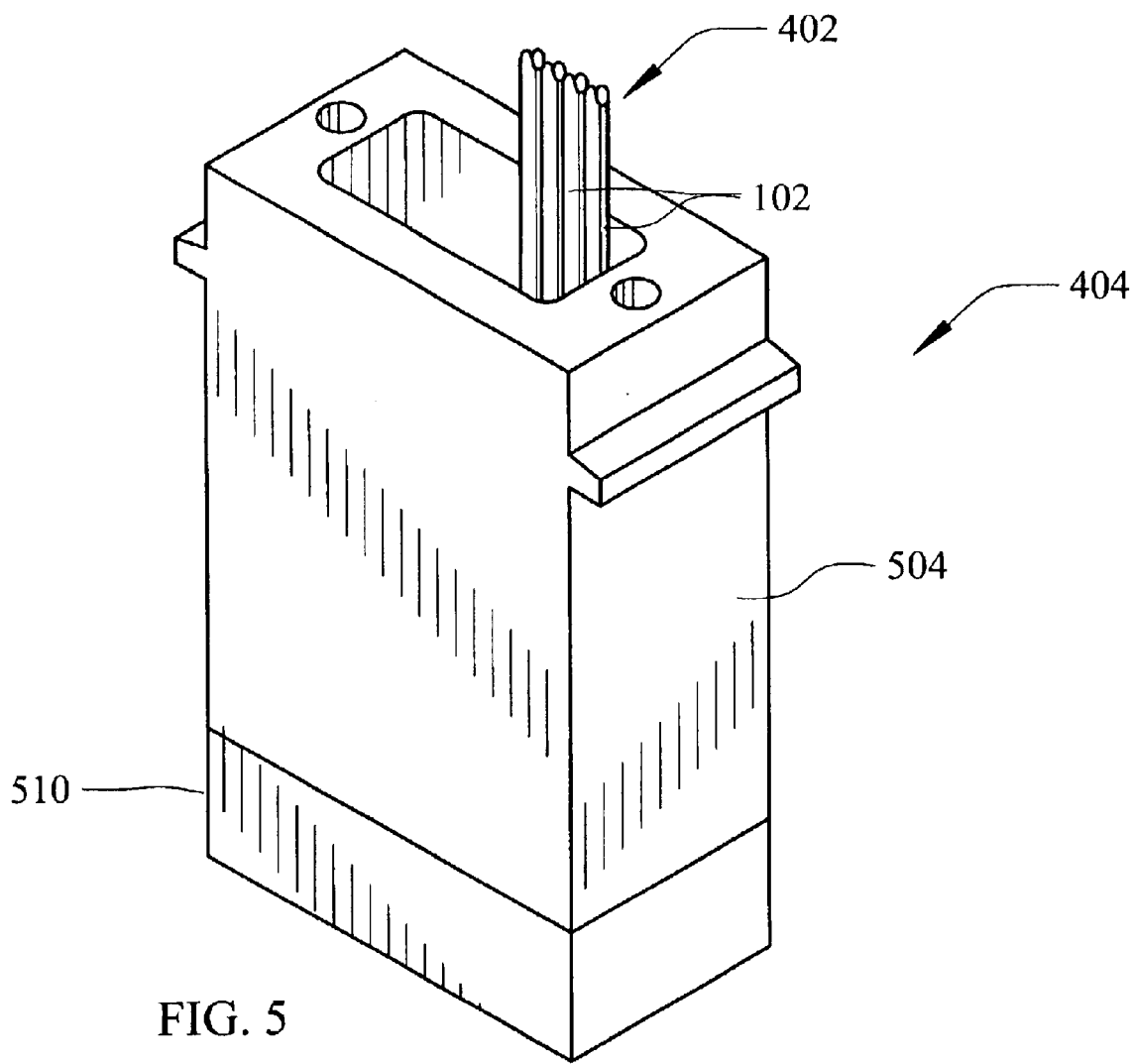
FIG. 5 is a perspective view showing a sensor body according to an embodiment of the present invention.

FIG. 5 shows details of one example of a sensor package 404. The sensor package 404 contains an interface housing 504 and a sensor module 510. Fibers 102 of the fiber cable 402 are terminated in the interface housing 504. In the example of FIG. 5, the interface housing 504 and sensor module 510 conform to the MT-RJ interface standard. Using an MT-RJ interface allows the use of off the shelf parts in fabricating the interface housing 504 and fiber cable 402.

In FIG. 5, the mirrors 104, 106 are arranged in a generally rectangular pattern. In some applications, this pattern may utilize a 250-micron spacing between source mirrors 104. A 250-micron spacing corresponds to the fiber spacing in an MT-RJ connector, therefore allowing the sensor module 510 to be compatible with industry standard connectors and hardware. In an MT-RJ compatible configuration, the fibers and collimating lens diameters range from 125 to 250 microns.

Although the MT-RJ interface is shown in FIG. 5, there are numerous other standard interfaces that could also be used in a sensor package 404 configured in accordance with concepts of the present invention. An arrangement using a standard optical connector interface provides an economical sensor package that can easily be assembled and replaced. For example, the sensor module 510 can easily be replaced or upgraded in the field.

Other non-rectangular arrangements of the collector mirror 106 and source mirrors 104 may also be utilized as performance or space dictates. For example, the source mirrors 104 could be arranged in a full or semi-circular pattern around the collector mirror 106 which is located at a centerpoint of the circular pattern. Such a circular arrangement could be used with a sensor package 404 having a custom sensor module 510 and interface housing 504. Alternatively, the sensor package 404 could be made as an integral unit, thereby allowing a very small form factor.

Figure 6:
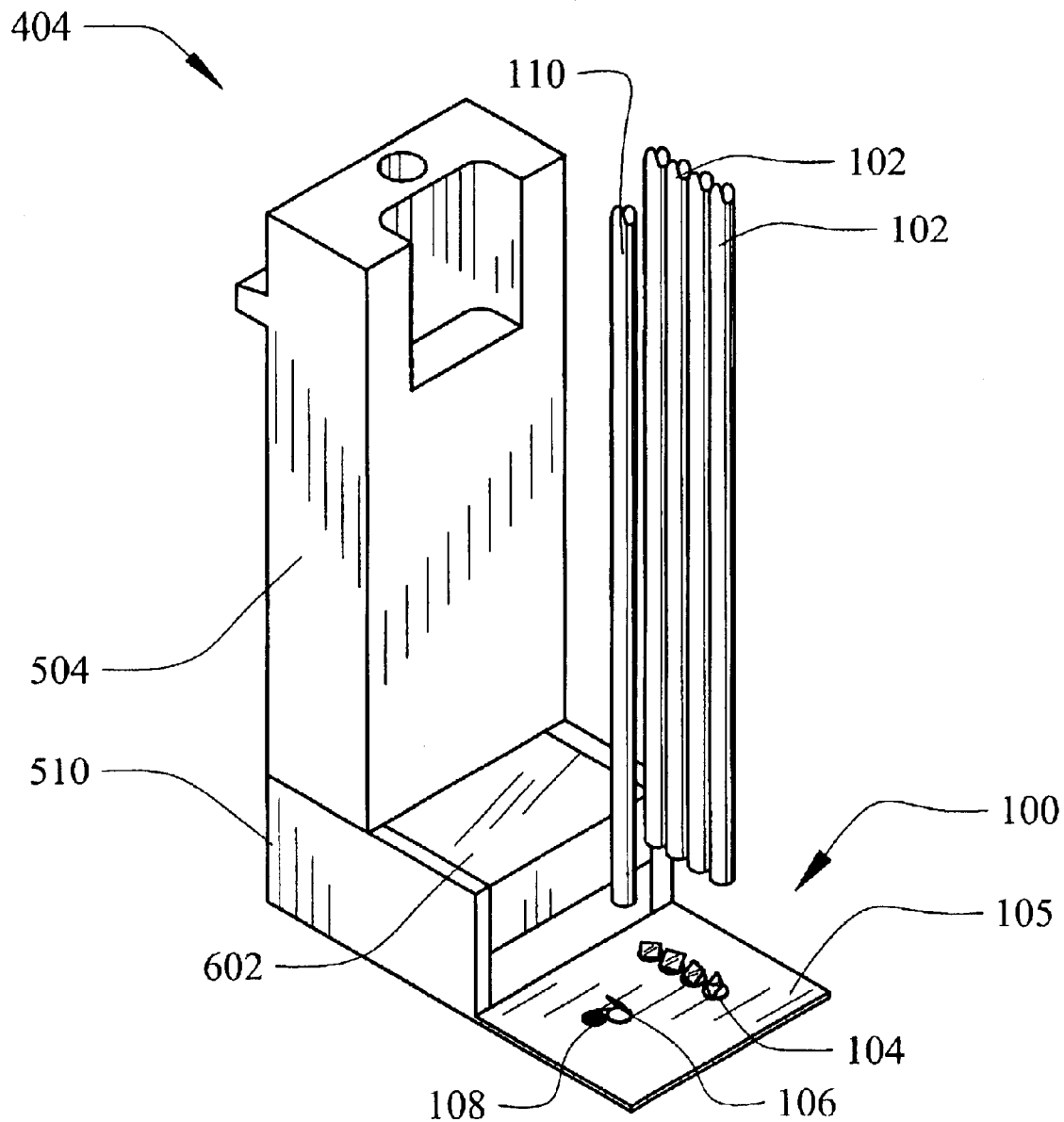
FIG. 6 is a cutaway view of the sensor body of FIG. 5 illustrating the location of various parts of a sensor according to an embodiment of the present invention.

FIG. 6 is a cutaway view of the sensor package 404 shown in FIG. 5. The light collector 10 and light sources 102 are embedded within the connector housing 504. The light collector 110 and sources 102 can be the terminating ends of optic fibers, waveguides, or any sort of passive or active device. A collimating lens assembly 602 is located within the sensor module 510 immediately below the terminating ends of the light sources 102 and light collector 110. The collimating lens assembly 602 focuses light from the light sources 102 to the mirrors 104 and from the collector mirror 106 to the light collector 110.

The collimating lens assembly 602 is shown integrated with the sensor module 510. The lens assembly 602 can be a single piece lens, a lenslet array, or any combination of individual lenses or collimating devices. The collimating lens assembly 602 can alternately be configured as part of the interface housing 504, or as a separate device that is placed between the interface housing 504 and sensor module 510.

A sensor according to the present invention allows multiplexed optical signals to be used to supply the light sources 102 and at the light collector 110. Assuming that the various wavelengths supplied to the light sources 102 are broken out by a component (e.g. a coupler) at the sensor end, only two fibers are needed, and the fiber cable 402 can be made very thin. Further, multiplexing the optical signals allows multiple sensors to be used in one assembly while still only requiring two fibers be provided along the cable 402.

Figure 7:
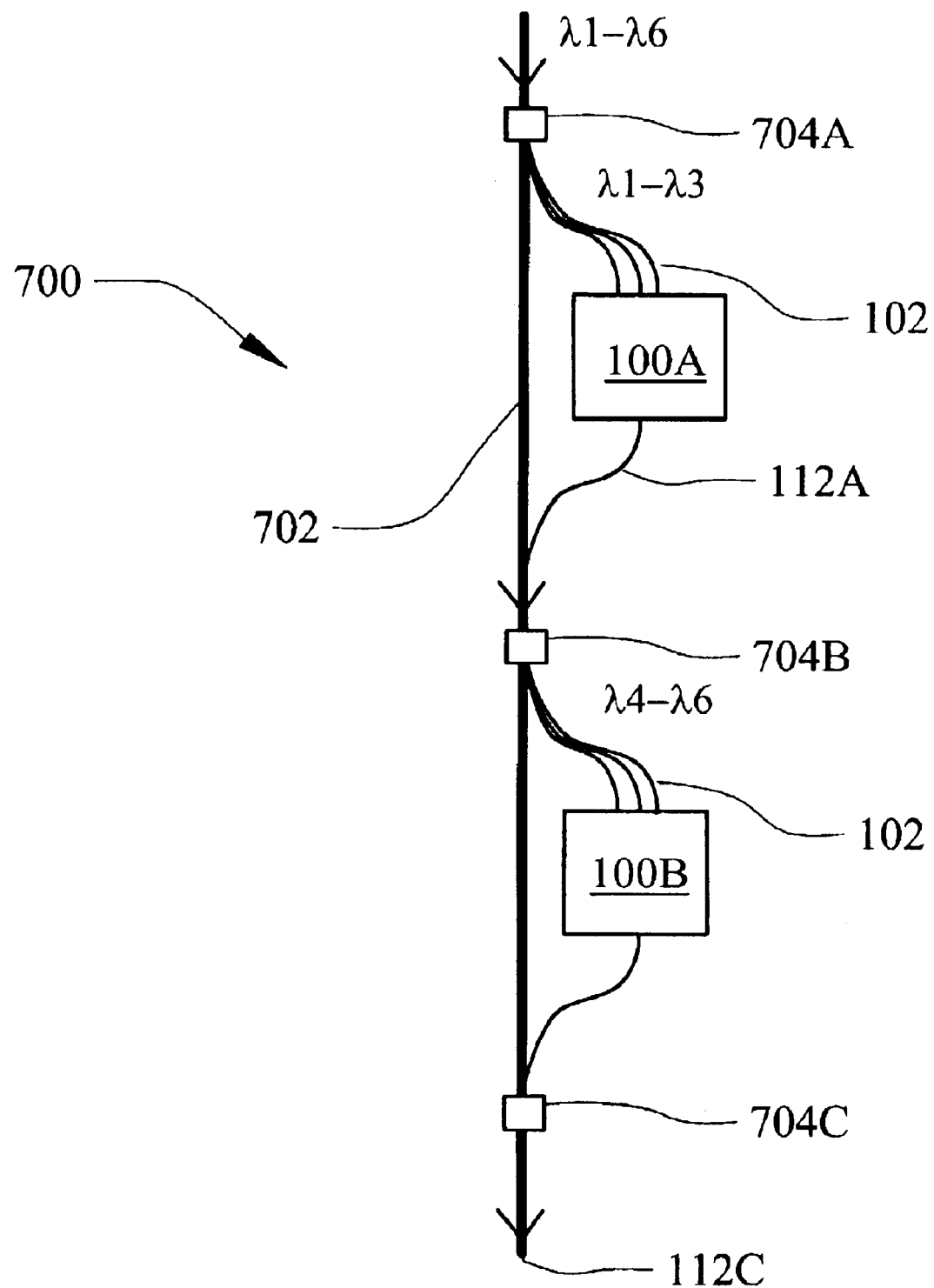
FIG. 7 is a diagram of a multiple sensor arrangement according to an embodiment of the present invention.

FIG. 7 shows a sensor assembly 700 containing multiple sensors 100A and 100B. In this example, the light inputs/outputs includes a composite signal of six unique wavelengths, $\lambda_1$–$\lambda_6$. The composite signal passes through a fiber cable 702 and is broken out to the various light sources 102 at couplers 704A and 704B before entering the sensors 100A and 100B. The couplers 704A and 704B can be any sort of optical device for splitting combining light sources, such as a wavelength-division multiplex (WDM) demultiplexer. The output of coupler 704A contains sources 102 with frequencies $\lambda_1$, $\lambda_2$, and $\lambda_3$ and the output of coupler 704A contains sources 102 with frequencies $\lambda_4$, $\lambda_5$, and $\lambda_6$. The sensor outputs 112A and 112B are recombined in the fiber cable 702 at couplers 704B and 704C to form output signal 112C.

A sensor arrangement as shown in FIG. 7 allows a plurality of sensors 100 to utilize the same fiber, thereby significantly reducing the size of the cable 702. The composite signal 112C can be examined at wavelengths $\lambda_1$–$\lambda_6$ to make simultaneous readings of all the sensors 100 in the assembly.

It will, of course, be understood that various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A sensing device arranged to gather light from one or more light sources, each light source having a unique primary wavelength, comprising:
   one or more source mirrors arranged to reflect light from the respective light sources;
   a collector mirror arranged to reflect light from the source mirrors;
   a light collector arranged to gather light reflected from the collector mirror; and
   a MEMS actuation member coupled to the collector mirror, the MEMS actuation member arranged to move the collector mirror in response to a change in a physical phenomena, wherein movement of the collector mirror causes a change in the relative intensities of the primary wavelengths at the light collector.

2. The sensing device of claim 1, wherein the one or more source mirrors each comprise a MEMS mirror.

3. The sensing device of claim 1, wherein the collector mirror comprises a MEMS mirror.

4. The sensing device of claim 1, wherein the MEMS actuation member is arranged to rotate the collector mirror in response to a change in a physical phenomena.

5. The sensing device of claim 1, wherein the MEMS actuator comprises a spiral spring, the spiral spring moving the collector mirror in response to a temperature change.

6. The sensing device of claim 1, further comprising:
   a sensor housing containing the collector mirror, the MEMS actuator, and the source mirrors; and
   an interface housing containing at least part of the light collector and at least part of each of the light sources, the interface housing removably attachable to the sensor housing.

7. The sensing device of claim 1, wherein the light collector and light sources comprise optical fibers.

8. The sensing device of claim 1, further comprising one or more collimating lenses between each light source and the respective mirror of the one or more source mirrors.

9. The sensing device of claim 1, further comprising a collimating lens between the light collector and the collector mirror.

10. A method of measuring a value of a physical phenomena, comprising:
    directing one or more light beams to one or more respective source mirrors, each light beam having a unique primary wavelength;
    reflecting the light beams by the respective source mirrors to direct the light beams to a collector mirror, the collector mirror coupled to a MEMS actuator arranged to move the collector mirror in response to the physical phenomena;
    reflecting the light beams from the collector mirror to a light collector;
    determining relative intensities of the unique primary wavelengths at the light collector to measure the value of the physical phenomena.

11. The method of claim 10, further comprising collimating the light beams to focus the light beams on the respective source mirrors.

12. The method of claim 10, further comprising collimating the light beams to focus the light beams from the collector mirror to the light collector.

13. The method of claim 10, wherein the MEMS actuator comprises a spiral spring, the spiral spring moving the collector mirror in response to a temperature change.

14. The method of claim 10, wherein the MEMS actuator is arranged to rotate the collector mirror in response to the physical phenomena.

15. A sensor, comprising:
    one or more light source means each having an associated unique primary wavelength;
    one or more source reflection means to reflect light from the respective light source means;
    a collector reflection means to reflect light from the one or more source reflection means into a composite light beam;
    light collector means to collect the composite light beam; and
    a MEMS actuation means arranged to displace the collector reflection means in response to a physical phenomena, displacement of the collector reflection means modifying an orientation between the collector reflection means and each of the source reflection means so that a relative intensity of the unique primary wavelengths in the composite beams is modified.

16. The sensor of claim 15, wherein the source reflection means each comprise a MEMS reflection means.

17. The sensor of claim 15, wherein the collector reflection means comprises a MEMS reflection means.

18. The sensor of claim 15, wherein the MEMS actuation means is arranged to rotate the source reflection mean.

19. The sensor of claim 15, wherein the light collector means and the light source means comprise optical fibers.

20. The sensor of claim 15, further comprising:
    sensor housing means for containing the collector reflection means, the MEMS actuation means, and the source reflection means; and
    an interface housing means for containing at least a part of the light collector means and at least a part of each of the light source means, the interface housing, means removably attachable to the sensor housing means.

21. The sensor of claim 15, further comprising a collimating means to focus each light source means on the respective source reflection means.

22. The sensor of claim 15, further comprising a collimating means to focus the collector reflection means on the light collector means.

23. A sensing device arranged to gather light from a light source, comprising:
    a source mirror arranged to reflect light from the light source;
    one or more collector mirrors arranged to reflect light from the source mirror,
    one or more light collectors arranged to gather light reflected from the respective collector mirrors; and
    a MEMS actuation member coupled to the source mirror, the MEMS actuation member arranged to move the source mirror in response to a change in a physical phenomena, wherein movement of the source mirror causes a change in relative intensities of light measured at the light collectors.

24. The sensing device of claim 23, wherein the collector mirrors each comprise a MEMS mirror.

25. The sensing device of claim 23, wherein the source mirror comprises a MEMS mirror.

26. The sensing device of claim 23, wherein the MEMS actuation member is arranged to rotate the source mirror in response to a change in a physical phenomena.

27. The sensing device of claim 23, wherein the MEMS actuator comprises a spiral spring, the spiral spring moving the source mirror in response to a temperature change.

28. The sensing device of claim 23, further comprising:
   a sensor housing containing the collector mirrors, the MEMS actuator, and the source mirror; and
   an interface housing containing at least part of the light source and at least part of each of the light collectors, the interface housing removably attachable to the sensor housing.

29. The sensing device of claim 23, wherein the light collectors and light source comprise optical fibers.

30. The sensing device of claim 23, further comprising one or more collimating lenses between each light collector and the respective mirror of the one or more collector mirrors.

31. The sensing device of claim 23, further comprising a collimating lens between the light source and the source mirror.

32. A method of measuring a value of a physical phenomena, comprising:
   directing a light beam to a source mirror, the source mirror coupled to a MEMS actuator arranged to move the source mirror in response to the physical phenomena;
   reflecting the light beam by the source mirror to direct the light beams to one or more collector mirrors,
   reflecting the light beams from the collector mirrors to one or more respective light collectors;
   determining relative intensities of the light beam at the light collectors to measure the value of the physical phenomena.

33. The method of claim 32, further comprising collimating the light beam to focus the light beam on the source mirror.

34. The method of claim 32, further comprising collimating the light beam to focus the light beam from the collector mirrors to the respective light collectors.

35. The method of claim 32, wherein the MEMS actuator comprises a spiral spring, the spiral spring moving the source mirror in response to a temperature change.

36. The method of claim 32, wherein the MEMS actuator is arranged to rotate the source mirror in response to the physical phenomena.

37. A sensor, comprising:
   a light source means;
   a source reflection means to reflect light from the light source means;
   one or more collector reflection means to reflect light from source reflection means;
   one or more light collector means to collect the light from the respective collector reflection means; and
   a MEMS actuation means arranged to displace the source reflection means in response to a physical phenomena, displacement of the source reflection means modifying an orientation between the source reflection means and each of the collector reflection means so that a relative intensity of light at the light collector means is modified.

38. The sensor of claim 37, wherein the collector reflection means each comprise a MEMS reflection means.

39. The sensor of claim 37, wherein the source reflection means comprises a MEMS reflection means.

40. The sensor of claim 37, wherein the MEMS actuation means is arranged to rotate the collector reflection mean.

41. The sensor of claim 37, wherein the light collector means and the light source means comprise optical fibers.

42. The sensor of claim 37, further comprising:
   sensor housing means for containing the collector reflection means, the MEMS actuation means, and the source reflection means; and
   an interface housing means for containing at least a part of the light source means and at least a part of each of the light collector means, the interface housing means removably attachable to the sensor housing means.

43. The sensor of claim 37, further comprising a collimating means to focus the light source means on the source reflection means.

44. The sensor of claim 37, further comprising a collimating means to focus each of the collector reflection means on the respective light collector means.

* * * * *